US008981160B2

(12) United States Patent
Nakanishi et al.

(10) Patent No.: US 8,981,160 B2
(45) Date of Patent: Mar. 17, 2015

(54) MODIFIED LIQUID EPOXY RESIN AS WELL AS EPOXY RESIN COMPOSITION USING THE SAME AND CURED PRODUCT THEREOF

(75) Inventors: Masataka Nakanishi, Tokyo (JP); Katsuhiko Oshimi, Tokyo (JP); Takao Sunaga, Tokyo (JP)

(73) Assignee: Nipponkayaku Kabushikikaisha, Tokyo (JP)

( * ) Notice: Subject to any disclaimer, the term of this patent is extended or adjusted under 35 U.S.C. 154(b) by 21 days.

(21) Appl. No.: 12/377,831

(22) PCT Filed: Aug. 14, 2007

(86) PCT No.: PCT/JP2007/065862
§ 371 (c)(1),
(2), (4) Date: Feb. 17, 2009

(87) PCT Pub. No.: WO2008/020594
PCT Pub. Date: Feb. 21, 2008

(65) Prior Publication Data
US 2010/0179353 A1      Jul. 15, 2010

(30) Foreign Application Priority Data

Aug. 17, 2006   (JP) ................................. 2006-222268

(51) Int. Cl.
C07C 43/03       (2006.01)
C08G 59/06       (2006.01)

(52) U.S. Cl.
CPC .................................... *C08G 59/063* (2013.01)
USPC ......................................... 568/640; 568/671

(58) Field of Classification Search
None
See application file for complete search history.

(56) References Cited

U.S. PATENT DOCUMENTS 5,623,031 A * 4/1997 Imura et al. ................... 525/489
5,656,350 A   8/1997 Koyama et al.
5,789,482 A * 8/1998 Eldin et al. ...................... 525/65

FOREIGN PATENT DOCUMENTS

| JP | 2002219812 | A  |   | 9/1990  |           |
|----|------------|----|---|---------|-----------|
| JP | 10298372   |    | * | 11/1998 | C08L 25/02|
| JP | 2000017043 |    | * | 1/2000  | C08G 59/08|
| JP | 2001064355 | A  |   | 3/2001  |           |
| JP | 2003-277468| A  |   | 10/2003 |           |
| JP | 2003277468 |    | * | 10/2003 |           |
| JP | 2004035702 | A  |   | 2/2004  |           |
| JP | 2004269705 | A  |   | 9/2004  |           |
| JP | 2005-226004|    | * | 8/2005  |           |
| JP | 2005-226004| A  |   | 8/2005  |           |
| JP | 2006063207 | A  |   | 3/2006  |           |
| WO | 2005078001 | A1 |   | 8/2005  |           |
| WO | 2007083715 | A1 |   | 7/2007  |           |

OTHER PUBLICATIONS

Computer generated English translation of JP 2005-226004, published Aug. 2005, abstract, claims and detailed description.*
Computer generated English translation of JP 2005-226004, description and claims.*
PCT/JP2007/065862 International Search Report, Nov. 13, 2007.
Office Action from Chinese Patent Office in counterpart application, JP200780036896.7, dated Nov. 11, 2010.
English translation of Office Action from Chinese Patent Office in counterpart application, JP200780036896.7, dated Nov. 11, 2010.
Office Action from Chinese Patent Office in counterpart application, CN200780036896.7, dated Jun. 22, 2011.
English translation of Office Action from Chinese Patent Office in counterpart application, CN200780036896.7, dated Jun. 22, 2011.
Office Action from Taiwanese Patent Office, TW Appl. No. 96130321, Apr. 11, 2013, 5 pp.
English translation of Office Action from Taiwanese Patent Office, TW Appl. No. 96130321, Apr. 11, 2013, 5 pp.
KIPO Office Action, KR Patent Appl. No. 10-2009-7005059, Oct. 18, 2013, 4 pp.
English translation, KIPO Office Action, KR Patent Appl. No. 10-2009-7005059, Oct. 18, 2013, 4 pp.

* cited by examiner

*Primary Examiner* — Rosalynd Keys
(74) *Attorney, Agent, or Firm* — David J. Aston; Peters Verny, LLP

(57) ABSTRACT

This invention provides a modified liquid epoxy resin having a low viscosity and a high performance, which is obtained by reacting a mixture of a bisphenol and a phenol aralkyl resin with an epiholohydrin. The bisphenol is preferable to be bisphenol F and is further preferable to have a bifunctional form purity as detected by gel permeation chromatography at UV 254 nm of not less than 95% by area in view of the fluidity. Moreover, the mixture of bisphenol and the phenol aralkyl resin is preferable to have a ratio of the phenol aralkyl resin of 10-70% by mass.

3 Claims, No Drawings

MODIFIED LIQUID EPOXY RESIN AS WELL AS EPOXY RESIN COMPOSITION USING THE SAME AND CURED PRODUCT THEREOF

CROSS-REFERENCE TO RELATED APPLICATIONS

This application claims priority as a national phase filing of PCT Patent Application No. PCT/JP2007/065862 filed on Aug. 14, 2007, and this application further claims priority to Japanese patent application 2006-222268, filed on Aug. 17, 2006, both of which are hereby incorporated by reference in their entirety.

TECHNICAL FIELD

This invention relates to a modified liquid epoxy resin having a low viscosity and a high functionality as well as an epoxy resin composition containing above modified liquid epoxy resin and a cured product of above epoxy resin composition.

BACKGROUND ART

An epoxy resin is cured by curing with various curing agents to form a cured body being generally excellent in the mechanical properties, water resistance, chemical resistance, heat resistance, electrical properties and the like, so that it is utilized in a wide range of fields such as adhesives, paints, laminated sheets, molding materials, casting materials, resists and so on. Lately, in the field of semiconductor-related materials are particularly overflowed electronic devices such as camera mobile-phones, super-thin liquid crystal and plasma TVs, lightweight notebook computers and so on using the term of light, thin, short, small or the like as a keyword, and hence very high characteristics are required even in packaging materials typified by the epoxy resin. Especially, leading-edge packages become complicated in their structures, and hence it is increasing a case that the sealing is difficult without a liquid sealant. For example, a package of a cavity-down type structure such as an enhanced BGA is necessary to be partially sealed, and therefore it cannot be prepared by a transfer molding. Because of this, it is demanded to develop a liquid epoxy resin having a high functionality.

Recently, RTM system is used as a composite material or a structural material for a vehicle body or a ship because of a simplicity of its production method. As a composition used in such materials is desired a low viscosity epoxy resin because of easy impregnation into carbon fiber or the like.

Heretofore, a compound obtained by reacting bisphenol A with epihalohydrin is known as an industrially most used liquid epoxy resin. However, it is pointed out that although such a bisphenol A-type epoxy resin is balanced physically, a cured material thereof is insufficient in the heat resistance, mechanical strength, humidity resistance and so on.

As a countermeasure to such problems, JP-A-2004-269705 and JP-A-2004-35702 report, for example, a way of adding and mixing a bisphenol F-type epoxy resin with a phenol aralkyl-type epoxy resin. By such a way are improved physical characteristics such as impact resistance and the like, but the resulting epoxy resin composition is still high in the viscosity. Therefore, it is desired to develop an epoxy resin having a lower viscosity and a high functionality.

DISCLOSURE OF THE INVENTION

It is, therefore, an object of the invention to solve the above-mentioned problems of the conventional techniques and to provide a modified liquid epoxy resin having a low viscosity and a high functionality. Also, it is another object of the invention to provide an epoxy resin composition containing such a modified liquid epoxy resin and a cured product thereof.

The inventors have made various studies on a liquid aromatic epoxy resin resulting in a cured product with high heat resistance and mechanical strength in order to achieve the above objects and found that a modified liquid epoxy resin having a low viscosity and a high functionality is obtained by including a specified molecular structure, and as a result the invention has been accomplished.

That is, the summary and construction of the invention are as follows.

1. A modified liquid epoxy resin, which is obtained by mixing a bisphenol and a phenol aralkyl resin and reacting the resulting mixture with an epihalohydrin.

2. A modified liquid epoxy resin according to the item 1, wherein the bisphenol is bisphenol F.

3. A modified liquid epoxy resin according to the item 1 or 2, wherein a ratio of the phenol aralkyl resin occupied in the mixture of the bisphenol and the phenol aralkyl resin is 10-70% by mass.

4. A modified liquid epoxy resin according to the item 2 or 3, wherein a bifunctional form purity of the bisphenol F is not less than 95% by area as detected by a gel permeation chromatography at UV 254 nm.

5. An epoxy resin composition comprising a modified liquid epoxy resin as described in any one of the items 1-4 and a curing agent.

6. A cured product of an epoxy resin composition, which is formed by curing an epoxy resin composition described in the item 5.

According to the invention, there can be provided a modified liquid epoxy resin having a low viscosity while maintaining high curing properties by mixing a bisphenol and a phenol aralkyl resin and reacting the resulting mixture with an epihalohydrin to conduct epoxidation. Also, there can be provided an epoxy resin composition containing such a modified liquid epoxy resin and a cured product thereof, which are very useful in a wide range of applications such as electrical and electronic materials, molding materials, casting materials, laminating materials, paints, adhesives, resists, optical materials and so on.

BEST MODE FOR CARRYING OUT THE INVENTION

The modified liquid epoxy resin according to the invention is obtained by mixing a bisphenol and a phenol aralkyl resin and reacting the resulting mixture with an epihalohydrin to conduct epoxidation. The modified liquid epoxy resin according to the invention is different from the conventional epoxy resin obtained by mixing plural epoxy resins for high functionalization and is characterized by mixing phenolic forms corresponding to the conventional epoxy resin and epoxidizing the resulting mixture, so that the viscosity of the resulting epoxy resin becomes lower that that of the conventional epoxy resin obtained by mixing the plural epoxy resins themselves. This is considered due to the fact that the bisphenol and the phenol aralkyl resin are partially bonded through a ring-opened bond of the epihalohydrin or a bond of —$CH_2CH(OH)CH_2$—. Moreover, the modified liquid epoxy resin is in liquid form at room temperature (25° C.).

As the bisphenol usable in the invention are mentioned compounds such as bisphenol A, bisphenol F, bisphenol E, bisphenol S, thiobisphenol, bis(4-hydroxyphenyl)methanone, bis(4-hydroxyphenyl)ether and the like, and among them, bisphenol F is particularly preferable. When bisphenol F is used as a starting material for the modified liquid epoxy resin according to the invention, the viscosity of the resulting modified liquid epoxy resin can be largely lowered.

The bisphenol F applicable to the invention is not particularly limited as long as it is typically commercially available bisphenols F, but is preferable that a bifunctional form purity as detected by a gel permeation chromatography at UV 254 nm is not less than 95% by area in view of the fluidity (lowering of viscosity) of the resulting epoxy resin. Moreover, the term "% by area" used herein represents a measured value detected by the gel permeation chromatography at UV 254 nm if not otherwise specified. Also, the bisphenol F may include a compound represented by the following formula (1):

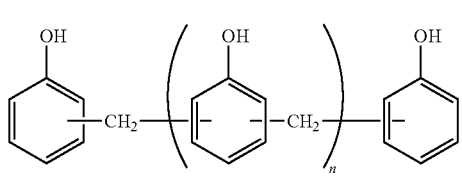

(wherein n represents a repeating number and is an integer of not less than 1) as an impurity during the production. Among the compounds represented by the formula (1), the content of the compound wherein n is an integer of not less than 1 is preferable to be not more than 2% by area, and the content of the compound wherein n is an integer of 1 to 2 is more preferable to be not more than 2% by area. As such a bisphenol F are commercially available ones, which include, for example, BisF-ST made by Mitsui Chemicals, Inc. (bifunctional form purity: >98% by area), BPF-D made by Honshu Chemical Industry Co., Ltd. (bifunctional form purity: >98% by area) and so on. Moreover, the commercially available bisphenol F usually contains substantially 9 to 11% by area of a compound wherein n is an integer of not less than 1 among the compounds represented by the formula (1).

The phenol aralkyl resin usable in the invention is a resin having such a molecular structure that an aromatic ring not having a hydroxyl group is bonded to phenol, naphthol or the like through a methylene bond, an ethylidene bond, a propylidene bond or the like. As a concrete example are mentioned a biphenyl-type phenol aralkyl resin (biphenyl novolac), a phenyl-type phenol aralkyl resin (Xyloc), a fluorenyl-type phenol aralkyl resin, a naphthalene-type phenol aralkyl resin and the like. Moreover, the phenol aralkyl resin is available as a commercially available one, which may concretely include XLC series made by Mitsui Chemicals, Inc., MEH-7851 series made by Meiwa Plastic industries, Ltd., KAYAHARD GPH series made by Nippon Kayaku Co., Ltd. and so on.

The method of synthesizing the modified liquid epoxy resin according to the invention will be described below. In the modified liquid epoxy resin according to the invention, it is required that a mixture of the bisphenol and the phenol aralkyl resin (hereinafter may be referred to as phenolic mixture) is used and epoxidized (glycidylated) by reacting with the epihalohydrin.

The ratio of the phenol aralkyl resin occupied in the mixture of the bisphenol and the phenol aralkyl resin is preferable to be within a range of 10 to 70% by mass. When the ratio of the phenol aralkyl resin is less than 10% by mass, the mixture is too high in the viscosity or forms a semisolid or solid resin and hence the handling ability becomes a problem, while when it exceeds 70% by mass, the mixture forms a low-viscosity liquid epoxy resin, but a cured product thereof is unfavorably large in the change ratio of linear expansion by heat or low in the elastic modulus. In the phenolic mixture, the mixing ratio of bisphenol (A) and phenol aralkyl resin (B) in a mass ratio (A/B) as converted to epoxy resin is preferably 3/7 to 8/2, more preferably 4/6 to 8/2. As the amount of the phenol aralkyl resin used to the bisphenol becomes large, the water absorption properties and heat resistance of the cured product are improved.

As the epihalohydrin used in the epoxidation reaction are mentioned epichlorohydrin, α-methylepichlorohydrin, γ-methylepichlorohydrin, epibromohydrin and the like. In the invention is preferable epichlorohydrin which is industrially easily-available. The amount of the epihalohydrin used is usually 3 to 20 moles, preferably 4 to 10 moles based on one mole of hydroxyl group in the starting phenolic mixture.

In the epoxidation reaction, it is preferable to use an alkali metal hydroxide. As the alkali metal hydroxide are mentioned sodium hydroxide, potassium hydroxide and the like. Moreover, the alkali metal hydroxide may be used as a solid material or as an aqueous solution. For example, in case of using the alkali metal hydroxide as an aqueous solution, the epoxidation reaction can be conducted by a method wherein the aqueous solution of the alkali metal hydroxide is continuously added into the reaction system while water and epihalohydrin are continuously distilled off under a reduced pressure or normal pressure, and further water is removed by separation and the recovered epihalohydrin is continuously returned into the reaction system. The amount of the alkali metal hydroxide used is usually 0.90 to 1.5 moles, preferably 0.95 to 1.25 moles, more preferably 0.99 to 1.15 moles based on one mole of hydroxyl group in the starting phenolic mixture.

In the epoxidation reaction, it is preferable to add a quaternary ammonium salt such as tetramethylammonium chloride, tetramethylammonium bromide, trimethylbenzylammonium chloride or the like as a catalyst for promoting the reaction. The amount of the quaternary ammonium salt used is usually 0.1 to 15 g, preferably 0.2 to 10 g based on one mole of hydroxyl group in the starting phenolic mixture.

In the epoxidation reaction, it is preferable to conduct the reaction by adding an alcohol such as methanol, ethanol or isopropyl alcohol or an aprotic polar solvent such as dimethyl sulfone, dimethyl sulfoxide, tetrahydrofuran, dioxane or the like in view of the promotion of the reaction.

In case of using the alcohol, the amount used is usually 2 to 50% by mass, preferably 4 to 20% by mass based on the amount of the epihalohydrin used. On the other hand, in case of using the aprotic polar solvent, the amount used is usually 5 to 100% by mass, preferably 10 to 80% by mass based on the amount of the epihalohydrin used.

In the epoxidation reaction, the reaction temperature is usually 30 to 90° C., preferably 35 to 80° C. On the other hand, the reaction time is usually 0.5 to 10 hours, preferably 1 to 8 hours. The reaction product through the epoxidation reaction may be purified by removing the epihalohydrin, the solvent and so on by heating under a reduced pressure after water washing or without water washing. Moreover, in order to obtain an epoxy resin having fewer hydrolyzable halogens, the recovered reaction product is dissolved in a solvent such as toluene, methyl isobutyl ketone or the like and added with an aqueous solution of an alkali metal hydroxide such as sodium hydroxide, potassium hydroxide or the like to conduct ring-closing reaction of a by-product, whereby the ring closure of a halohydrin as a by-product can be ensured. In this case, the amount of the alkali metal hydroxide used is usually 0.01 to 0.3 moles, preferably 0.05 to 0.2 moles based on one mole of hydroxyl group in the starting phenolic mixture used in the epoxidation. Also, the reaction temperature is usually 50 to 120° C., and the reaction time is usually 0.5 to 2 hours.

After the completion of the epoxidation reaction, the modified liquid epoxy resin according to the invention can be obtained by removing a formed salt through filtering, water washing or the like and further distilling off a solvent through heating under a reduced pressure.

The modified liquid epoxy resin according to the invention can be used as a starting material for various resins. For example, there are mentioned epoxy acrylate and its derivatives, an oxazolidone-based compound, a cyclic carbonate compound and the like.

The epoxy resin composition according to the invention will be described below. The epoxy resin composition according to the invention is required to comprise the above-mentioned modified liquid epoxy resin according to the invention and a curing agent as an essential component. In the epoxy resin composition according to the invention, the modified liquid epoxy resin may be used alone or in a combination with another epoxy resin. When the modified liquid epoxy resin is combined with another epoxy resin, the content of the modified liquid epoxy resin in the whole of the epoxy resins is preferable to be not less than 30% by mass, more preferably not less than 40% by mass. However, when the modified liquid epoxy resin is used as a modifying agent in the epoxy resin composition according to the invention, the content of the modified liquid epoxy resin in the whole of the epoxy resins is preferable to be within a range of 1 to 30% by mass.

As another epoxy resin capable of being combined with the modified liquid epoxy resin are mentioned, for example, a novolac-type epoxy resin, a bisphenol A-type epoxy resin, a biphenyl-type epoxy resin, a triphenylmethane-type epoxy resin, a phenol aralkyl-type epoxy resin and the like. There are concretely mentioned solid or liquid epoxy resins such as a polycondensation product of bisphenol A, bisphenol S, thiodiphenol, fluorene bisphenol, terpene diphenol, 4,4'-biphenol, 2,2'-biphenol, 3,3',5,5'-tetramethyl-[1,1'-biphenyl]-4,4'-diol, hydroquinone, resorcin, naphthalenediol, tris-(4-hydroxyphenyl)methane, 1,1,2,2-tetrakis(4-hydroxyphenyl)ethane or phenols (phenol, an alkyl-substituted phenol, naphthol, an alkyl-substituted naphthol, dihydroxybenzene, dihydroxynaphthalene or the like) with formaldehyde, acetaldehyde, benzaldehyde, p-hydroxybenzaldehyde, o-hydroxybenzaldehyde, p-hydroxyacetophenone, o-hydroxyacetophenone, dicyclopentadiene, furfural, 4,4'-bis(chloromethyl)-1,1'-biphenyl, 4,4'-bis(methoxymethyl)-1,1'-biphenyl, 1,4-bis(chloromethyl)benzene, 1,4-bis(methoxymethyl)benzene or the like as well as a modified product thereof, a glycidyl-etherified product derived from halogenated bisphenols such as tetrabromobisphenol A or the like or alcohols, an alicyclic epoxy resin, a glycidyl amine-based epoxy resin, a glycidyl ester-based epoxy resin and so on, but the another epoxy resin is not limited thereto. These resins may be used alone or in a combination of two or more.

As the curing agent included in the epoxy resin composition according to the invention are mentioned, for example, an amine-based compound, an acid anhydride-based compound, an amide-based compound, a phenol-based compound, a carboxylic acid-based compound and so on. As a concrete example of the curing agent used are mentioned a polycondensation product of diaminodiphenylmethane, diethylenetriamine, triethylenetetramine, diaminodiphenylsulfone, diethyldiaminotoluene or alkyl(methyl or ethyl)aniline with formaldehyde; isophoronediamine, dicyandiamide, a polyamide resin synthesized by linolenic acid dimer and ethylenediamine; phthalic anhydride, trimellitic anhydride, pyromellitic anhydride, maleic anhydride, tetrahydrophthalic anhydride, methyltetrahydrophthalic anhydride, methylnadic anhydride, hexahydrophthalic anhydride, methylhexahydrophthalic anhydride; a polycondensation product of bisphenol A, bisphenol F, bisphenol S, fluorene bisphenol, terpene diphenol, 4,4'-biphenol, 2,2'-biphenol, 3,3',5,5'-tetramethyl-[1,1'-biphenyl]-4,4'-diol, hydroquinone, resorcin, naphthalenediol, tris-(4-hydroxyphenyl)methane, 1,1,2,2-tetrakis(4-hydroxyphenyl)ethane or phenols (phenol, an alkyl-substituted phenol, naphthol, an alkyl-substituted naphthol, dihydroxybenzene, dihydroxynaphthalene or the like) with formaldehyde, acetaldehyde, benzaldehyde, p-hydroxybenzaldehyde, o-hydroxybenzaldehyde, p-hydroxyacetophenone, o-hydroxyacetophenone, dicyclopentadiene, furfural, 4,4'-bis(chloromethyl)-1,1'-biphenyl, 4,4'-bis(methoxymethyl)-1,1'-biphenyl, 1,4-bis(chloromethyl)benzene, 1,4-bis(methoxymethyl)benzene as well as a modified product thereof; a halogenated bisphenol such as tetrabromobisphenol A or the like; imidazole, a trifluoroborane-amine complex, a guanidine derivative, a condensate of terpene and phenols, and so on, but the curing agent is not limited thereto. These curing agents may be used alone or in a combination of two or more. In the invention is particularly preferable an amine-based curing agent such as diaminodiphenylmethane, diethylenetriamine, triethylenetetramine, diaminodiphenylsulfone, diethyldiaminotoluene, a polycondensation product of alkyl(methyl or ethyl)aniline with formaldehyde, isophoronediamine or the like. More particularly, a liquid amine-based curing agent such as diethyldiaminotoluene, a polycondensation product of ethylaniline with formaldehyde or the like is preferable to be used as at least one component.

In the epoxy resin composition according to the invention, the content of the curing agent is preferable to be 0.7 to 1.2 equivalents based on 1 equivalent of epoxy group in the epoxy resin. When the content of the curing agent is less than 0.7 equivalent or more than 1.2 equivalents based on 1 equivalent of the epoxy group, the curing of the modified epoxy resin composition becomes imperfect and hence it is feared that good curing properties are not obtained.

The epoxy resin composition according to the invention may further contain a curing accelerator. As a concrete example of the curing accelerator used are mentioned imidazoles such as 2-methylimidazole, 2-ethylimidazole, 2-ethyl-4-methylimidazole and the like; a tertiary amine such as 2-(dimethylaminomethyl)phenol, 1,8-diaza-bicyclo(5,4,0)undecene-7 or the like; phosphines such as triphenylphosphine and the like; a metal compound such as tin octylate or the like; and so on. The amount of the curing accelerator used is properly selected, if necessary, but is preferable to be 0.1 to 5.0 parts by mass based on 100 parts by mass of the total epoxy resin (the modified liquid epoxy resin and another epoxy resin, the same shall apply hereinafter).

The epoxy resin composition according to the invention may contain a phosphorous-containing compound as a flame-retardant component. The phosphorous-containing compound may be reactive-type or additive-type. As a concrete example of the phosphorous-containing compound are mentioned a phosphoric ester such as trimethyl phosphate, triethyl phosphate, tricresyl phosphate, trixylylenyl phosphate, cresyldiphenyl phosphate, cresyl-2,6-dixylylenyl phosphate, 1,3-phenylenebis(dixylylenyl phosphate), 1,4-phenylenebis(dixylylenyl phosphate), 4,4'-biphenyl(dixylylenyl phosphate) or the like; a phosphane such as 9,10-dihydro-9-oxa-10-phosphaphenanthrene-10-oxide, 10(2,5-dihydroxyphenyl)-10H-9-oxa-10-phosphaphenanthrene-10- oxide or the like; a phosphorous-containing epoxy compound obtained by reacting an epoxy resin with an active hydrogen of the phosphane, red phosphorous and so on. Among them, the phosphoric esters, phosphanes and phosphorous-containing epoxy compound are preferable, and 1,3-phenylenebis(dixylylenyl phosphate), 1,4-phenylenebis(dixylylenyl phosphate), 4,4'-biphenyl(dixylylenyl phosphate) or the phosphorous-containing epoxy compound is particularly preferable. The content of the phosphorous-containing compound is preferable to satisfy a ratio of phosphorous-containing compound/total epoxy resin=0.1 to 0.6 (mass ratio). When the mass ratio of the phosphorous-containing compound to the total epoxy resin is less than 0.1, the flame retardance is insufficient, while when it exceeds 0.6, there is a fear of badly affecting the hygroscopicity and dielectric characteristics of a cured product made of the epoxy resin composition.

The epoxy resin composition according to the invention may also contain a binder resin, if necessary. The binder resin includes a butyral-based resin, an acetal-based resin, an acrylic resin, an epoxy-nylon-based resin, an acrylonitrile-butadiene rubber (NBR)-phenol-based resin, an epoxy-NBR-based resin, a polyamide resin, a polyimide resin, a silicone-based resin and so on, but is not limited thereto. The content of the binder resin is preferable to be within a scope of not damaging the flame retardance and heat resistance of the cured product made of the epoxy resin composition, and usually 0.05 to 50 parts by mass, preferably 0.05 to 20 parts by mass of the binder resin based on 100 parts by mass of the total epoxy resin are used, if necessary.

Further, the epoxy resin composition may contain an inorganic filler, if necessary. The inorganic filler includes fine particles of crystalline silica, molten silica, alumina, zircon, calcium silicate, calcium carbonate, silicon carbide, silicon nitride, boron nitride, zirconia, forsterite, steatite, spinel, titania, talc or the like, and beads spheronized thereof, but is not limited thereto. The inorganic fillers may be used alone or in a combination of two or more. The content of the inorganic filler is preferable to be 0 to 95% by mass in the epoxy resin composition according to the invention. To the epoxy resin composition according to the invention can be also added a silane coupling agent, a releasing agent such as stearic acid, palmitic acid, zinc stearate, calcium stearate or the like; various additives such as pigment and the like, and various thermosetting resins.

The epoxy resin composition can be obtained by evenly mixing the modified liquid epoxy resin, the curing agent and various components properly selected, if necessary, with, for example, an extruder, a kneader, rolls or the like. Also, the cured product made of the epoxy resin composition according to the invention can be easily obtained by curing the epoxy resin composition in the same manner as in the conventionally known method. Concretely, the cured product made of the epoxy resin composition according to the invention can be obtained by sufficiently and uniformly mixing the modified liquid epoxy resin, the curing agent and various components properly selected, if necessary, with, for example, an extruder, a kneader, rolls or the like to form an epoxy resin composition, melting the epoxy resin composition, shaping the melt with a cast molding machine, a transfer molding machine or the like and further heating at 80-200° C. for 2-10 hours.

Also, the cured product made of the epoxy resin composition according to the invention can be obtained by dissolving the epoxy resin composition in a solvent such as toluene, xylene, acetone, methyl ethyl ketone, methyl isobutyl ketone, dimethylformamide, dimethylacetoamide, N-methylpyrrolidone or the like to form a varnish of the epoxy resin composition, impregnating the varnish into a base material such as glass fibers, a carbon fibers, alumina fibers, paper or the like and drying under heating to form a prepreg and then heat press-molding the prepreg. Moreover, the amount of the solvent used in the varnish of the epoxy resin composition is usually 10 to 70% by mass, preferably 15 to 70% by mass in a mixture of the epoxy resin composition and the solvent. Furthermore, the cured product made of the epoxy resin composition according to the invention can be obtained as a cured product of the epoxy resin composition formed by rendering the epoxy resin composition dissolved in the solvent into a complex with carbon fibers or the like through RTM (Resin Transfer Molding) system.

In the epoxy resin composition according to the invention, the modified liquid epoxy resin can be used as a modifying agent for the film-shaped epoxy resin composition. In this case, the content of the modified liquid epoxy resin occupied in the whole of the epoxy resins is preferable to be 1 to 30% by mass as described above. When the modified liquid epoxy resin is used as a modifying agent for the film-shaped epoxy resin composition, the flexibility and so on in B-stage can be concretely improved. This film-shaped epoxy resin composition can be obtained as a sheet-shaped adhesive by applying the varnish of the epoxy resin composition onto a releasing film and removing the solvent under heating to conduct B-stage. This sheet-shaped adhesive can be used as an interlaminar insulating layer in a multilayered substrate or the like.

Furthermore, the epoxy resin composition according to the invention and the cured product thereof can be used in applications commonly using a thermosetting resin such as an epoxy resin or the like. They can be used, for example, in an adhesive, a paint, a coating material, a shaping material (including a sheet, a film, FRP and so on), an insulating material (including a printed board, a wire covering and so on), a sealing medium and so on. In addition, they can be used as an additive for another resin such as a cyanate resin composition for sealing medium or substrate, an acrylate ester-based resin as a curing agent for resist or the like.

As the adhesive are mentioned adhesives for civil engineering, architecture, automobile, general office work and medical care but also an adhesive for electronic materials. As the adhesive for electronic materials are mentioned an interlaminar adhesive for a multilayer substrate such as a build-up substrate or the like, a die bonding agent, an adhesive for semiconductor such as an under-fill or the like, an adhesives for packaging such as an under-fill for reinforcing BGA, an anisotropic conductive film (ACF), an anisotropic conductive paste (ACP) or the like, and so on.

As the sealing medium may be mentioned a potting, dipping or transfer molding sealant used in a condenser, a transistor, a diode, a light emitting diode, IC, LSI or the like; a potting sealant used in COB, COF, TAB or the like of IC or LSIs, a sealant during packaging of IC packages such as an under-fill used in flip-chip or the like, QFP, BGA, CSP or the like (including an under-fill for reinforcement), and so on.

EXAMPLES

The following examples are given in illustration of the invention and are not intended as limitations thereof. Moreover, the term "part(s)" of the composition expressed in Examples is part(s) by mass. Moreover, the epoxy equivalent, hydroxyl equivalent, melt viscosity, softening point and bifunctional form purity are measured according to the following methods.

(1) Epoxy Equivalent

It is measured according to JIS K 7236. The unit is g/eq.

(2) Hydroxyl Equivalent

It is calculated from data on the number of nuclei through a gel permeation chromatography.

Column: Shodex SYSTEM-21 column KF-804L+KF-803L (×2 columns)

Measuring temperature: 40° C.

Bonding eluent: tetrahydrofuran

Flow rate: 1 ml/min.

Detection: UV 254 nm

Calibration curve: use of a standard polystyrene made by Shodex (3) Softening Point It is measured according to JIS K 7234.

(4) Melt Viscosity

It is measured with an E-type viscometer. The unit is Pa·s.

(5) Bifunctional Form Purity

The bifunctional form purity (content of bis(hydroxyphenyl)methane) is determined through a gel permeation chromatography under the following conditions. Moreover, the data of measured results are represented by area % (G).

Column: Shodex SYSTEM-21 column KF-804L+KF-803L (×2 columns)

Measuring temperature: 40° C.

Eluent: tetrahydrofuran

Flow rate: 1 ml/min.

Detection: UV 254 nm

Calibration curve: use of a standard polystyrene made by Shodex

Synthesis Example 1 of Phenol Aralkyl Resin

Into a flask equipped with a thermometer, a reflux condenser, a fractionating column and an agitator and purged with nitrogen is charged 426 parts of phenol, which is held at 80° C. and then added with 251 parts of 4,4'-bischloromethylbiphenyl over 4 hours separately. Further, they are reacted at a reaction temperature of 100° C. for 4 hours. The reaction is conducted while removing a by-produced hydrochloric acid outside the reaction system under a nitrogen atmosphere. After the completion of the reaction, the reaction mass is cooled and added with 300 parts of toluene and washed with water, and thereafter a phenol aralkyl resin (PA1) is obtained by distilling off toluene and excess of phenol from oil layer through heating under a reduced pressure. The PA1 has a softening point of 63° C. and a hydroxyl equivalent of 200 g/eq.

Example 1

Into a flask equipped with an agitator, a reflux condenser and a stirring apparatus and purged with nitrogen are charged 89.7 parts of bisphenol F (content of bis(hydroxyphenyl)methane ≥99 area % (G), BisF-ST made by Mitsui Chemicals, Inc.), 46.9 parts of the phenol aralkyl resin (PA1) obtained in Synthesis Example 1 (wherein a charging ratio of bisphenol F and phenol aralkyl resin is adjusted so that a mass ratio (A:B) as converted to bisphenol F-type epoxy resin (A) and phenol aralkyl-type epoxy resin (B) after the reaction is 7:3), 628 parts of epichlorohydrin and 66 parts of methanol, which are dissolved with stirring and raised up to 70° C. Then, 48.0 parts of a flaky sodium hydroxide is separately added over 90 minutes, and thereafter the reaction is further conducted at 70° C. for 1 hour. After the completion of the reaction, the reaction mass is washed with 200 parts of water and then solvents such as excess of epichlorohydrin and the like are distilled off from oil layer with a rotary evaporator at 140° C. under a reduced pressure. The residue is dissolved by adding 400 parts of methyl isobutyl ketone and raised up to 70° C. The resulting solution is added with 12 parts of an aqueous solution of 30% by mass of sodium hydroxide with stirring, which are reacted for 1 hour and washed with water until the washing water becomes neutral, and then methyl isobutyl ketone and the like are distilled off from the resulting solution with a rotary evaporator at 180° C. under a reduced pressure to obtain 189 parts of a modified liquid epoxy resin (EP1) according to the invention. The resulting modified liquid epoxy resin has an epoxy equivalent of 180 g/eq. and a viscosity at 30° C. of 9.5 Pa·s.

Example 2

Into a flask equipped with an agitator, a reflux condenser and a stirring apparatus and purged with nitrogen are charged 76.9 parts of bisphenol F (content of bis(hydroxyphenyl)methane ≥99 area % (G), BisF-ST made by Mitsui Chemicals, Inc.), 62.5 parts of the phenol aralkyl resin (PA1) obtained in Synthesis Example 1 (wherein a charging ratio of bisphenol F and phenol aralkyl resin is adjusted so that a mass ratio (A:B) as converted to bisphenol F-type epoxy resin (A) and phenol aralkyl-type epoxy resin (B) after reaction is 6:4), 600 parts of epichlorohydrin and 60 parts of methanol, which are dissolved with stirring and raised up to 70° C. Then, 45.9 parts of a flaky sodium hydroxide is separately added over 90 minutes, and thereafter the reaction is conducted at 70° C. for 1 hour. After the completion of the reaction, the reaction mass is washed with 200 parts of water, and then solvents such as excess of epichlorohydrin and the like are distilled off from oil layer with a rotary evaporator at 140° C. under a reduced pressure. The residue is dissolved by adding 400 parts of methyl isobutyl ketone and raised up to 70° C. The resulting solution is added with 11 parts of an aqueous solution of 30% by mass of sodium hydroxide with stirring, which are reacted for 1 hour and washed with water until the washing water becomes neutral, and then methyl isobutyl ketone and the like are distilled off from the resulting solution with a rotary evaporator at 180° C. under a reduced pressure to obtain 190 parts of a modified liquid epoxy resin (EP2) according to the invention. The resulting modified liquid epoxy resin has an epoxy equivalent of 190 g/eq. and a viscosity at 30° C. of 21.0 Pa·s.

Comparative Example 1

Into a flask equipped with an agitator, a reflux condenser and a stirring apparatus and purged with nitrogen are charged 160 parts of bisphenol F-type epoxy resin (RE-304S, an epoxy resin made by Nippon Kayaku Co., Ltd., epoxy equivalent: 180 g/eq., viscosity at 25° C.: 3900 mPa·s), 40 parts of phenol aralkyl-type epoxy resin (NC-3000 made by Nippon Kayaku Co., Ltd., epoxy equivalent: 277 g/eq.) and 300 parts of methyl ethyl ketone, which are fused by heating at 70° C. Methyl ethyl ketone is distilled off from the resulting solution with a rotary evaporator at 180° C. under a reduced pressure to obtain 200 parts of an epoxy resin (EP3) for comparison.

The resulting epoxy resin has an epoxy equivalent of 192 g/eq. and a viscosity at 30° C. of 10.1 Pa·s.

Comparative Example 2

200 parts of an epoxy resin (EP4) for comparison is obtained in the same manner as in Comparative Example 1 except that the amount of bisphenol F-type epoxy resin used in Comparative Example 1 is changed to 140 parts and the amount of phenol aralkyl-type epoxy resin used is changed to 60 parts. The resulting epoxy resin has an epoxy equivalent of 245 g/eq. and a viscosity at 30° C. of 30.4 Pa·s.

The results are summarized in the following Table 1. As seen from the comparison between Example 1 and Comparative Example 2, the modified liquid epoxy resin (EP1) according to the invention is low in the viscosity as compared with EP4 even if the mixing ratio of bisphenol F-type epoxy resin and phenol aralkyl-type epoxy resin is same. As seen from the comparison between Example 1 and Comparative Example 1, when the viscosity of the epoxy resin is matched to the same degree, more phenol aralkyl-type epoxy resin skeletons can be introduced into the modified liquid epoxy resin according to the invention.

TABLE 1

|  | Epoxy resin | BPF:PA[1] | Viscosity at 30° C. (Pa·s) |
|---|---|---|---|
| Example 1 | EP1 | 7:3 | 9.5 |
| Example 2 | EP2 | 6:4 | 21.0 |
| Comparative Example 1 | EP3 | 8:2[2] | 10.1 |
| Comparative Example 2 | EP4 | 7:3[2] | 30.4 |

[1]BPF: bisphenol F-type epoxy resin. PA: phenol aralkyl-type epoxy resin.
[2]RE-304S made by Nippon Kayaku Co., Ltd. is used as BPF. NC-3000 made by Nippon Kayaku Co., Ltd. is used as PA.

Examples 3 to 4 and Comparative Example 3

Epoxy resin compositions according to the invention and for comparison are prepared according to a compounding recipe (parts by mass) shown in Table 2 by using epoxy resins EP1, EP2 and EP3 of Example 1, Example 2 and Comparative Example 1 as an epoxy resin, KAYAHARD MCD (methylnadic anhydride made by Nippon Kayaku Co., Ltd.) as a curing agent and an imidazole-based catalyst (2E4MZ made by Shikoku Chemicals Corporation) as a curing catalyst (curing accelerator).

TABLE 2

|  |  |  | Example 3 | Example 4 | Comparative Example 3 |
|---|---|---|---|---|---|
| Epoxy resin | EP1 | parts by mass | 180 | — | — |
|  | EP2 |  | — | 190 | — |
|  | EP3 |  | — | — | 192 |
| Curing agent | KAYAHARD MCD |  | 64 | 64 | 64 |
| Curing catalyst | 2E4MZ |  | 1.8 | 1.9 | 1.9 |

A resin shaped body is prepared by a cast molding method using each of epoxy resin compositions of Examples 3 to 4 and Comparative Example 3, and cured at 120° C. for 2 hours and further at 150° C. for 6 hours to obtain a cured product.

The properties of the resulting cured product are measured according to the following methods. The results are shown in Table 3.

(6) Glass Transition Temperature (DMA)
It is measured according to JIS K 7244.
(7) Heat Deformation Temperature (HDT)
It is measured according to JIS K 7191.
(8) IZOD Impact Test
It is measured according to JIS K 6911.
(9) Moisture Absorption
A disc specimen of 5 cm in diameter×4 mm in thickness is left to stand under conditions of 85° C. and 85% humidity for 72 hours, and then a weight-increasing rate (%) of the specimen is determined.
(10) Water Absorption
A disc specimen of 5 cm in diameter×4 mm in thickness is boiled up in water at 100° C. for 72 hours, and then a weight-increasing rate (%) of the specimen is determined.

TABLE 3

|  | Example 3 | Comparative Example 3 | Example 4 |
|---|---|---|---|
| Epoxy resin used | EP1 | EP3 | EP2 |
| Viscosity of epoxy resin (Pa·s at 30° C.) | 9.5 | 10.1 | 21 |
| Glass transition temperature (° C.) | 186 | 188 | 195 |
| Heat deformation temperature (° C.) | 159 | 160 | 165 |
| IZOD (kJm) | 11.4 | 9.0 | 8.3 |
| Moisture absorption (%) | 1.8 | 1.8 | 1.7 |
| Water absorption (%) | 2.6 | 3.0 | 2.4 |

As seen from Table 3, when the viscosities of the epoxy resins used are in the same degree (EP1 and EP3), the cured product made of the epoxy resin composition according to the invention is excellent in the toughness (IZOD) and moisture (water) absorption without damaging the heat resistance as compared with the cured product of the epoxy resin composition for comparison using the epoxy resin obtained by mixing the bisphenol F-type epoxy resin and the phenol aralkyl-type epoxy resin. Moreover, it is found that the cured product made of the epoxy resin composition of Example 4 is large in the introducing amount of phenol aralkyl-type epoxy resin skeleton as compared with the cured product made of the epoxy resin composition of Example 3, which can improve the water absorption and heat resistance.

Examples 5 to 8

Each of modified liquid epoxy resins (EP5) to (EP8) according to the invention is obtained by conducting the same reaction as in Example 1 except that the mass ratio (A:B) as converted to bisphenol F-type epoxy resin (A) and phenol aralkyl-type epoxy resin (B) after the reaction is changed to a mass ratio shown in the following Table 4. The resin properties of the resulting modified liquid epoxy resin are also shown in Table 4.

Comparative Examples 4 to 5

Each of epoxy resins (EP9) to (EP10) for comparison is obtained in the same manner as in Comparative Example 1 except that the mass ratio of bisphenol F-type epoxy resin and phenol aralkyl-type epoxy resin is changed to a mass ratio shown in the following Table 4. The resin properties of the resulting epoxy resin are also shown in Table 4.

TABLE 4

|  |  | Example 5 | Example 6 | Example 7 | Example 8 | Comparative Example 4 | Comparative Example 5 |
|---|---|---|---|---|---|---|---|
| Epoxy resin |  | EP5 | EP6 | EP7 | EP8 | EP9 | EP10 |
| Bisphenol F-type epoxy resin | A(%) | 50 | 60 | 40 | 50 | 50 | 10 |
| Phenol aralkyl-type epoxy resin | B(%) | 50 | 40 | 60 | 50 | 50 | 90 |
| Purity of starting bisphenol F (area % (G)) |  | 99 | 99 | 99 | 95* | 93 | >99 |
| Properties of epoxy resin | Viscosity (Pa · s at 25° C.) | 82 | 57 | 91 | 98 | 155 | Semisolid |
|  | Epoxy equivalent (g/eq.) | 200 | 189 | 208 | 205 | 219 | 257 |

*It is prepared by mixing bisphenol F (purity > 99 area % (G)) and bisphenol F made by Honshu Chemical Industry Co., Ltd. (purity is not less than 89 area % (G)).

Examples 9 to 12 and Comparative Example 6

Epoxy resin compositions according to the invention and for comparison are prepared according to a compounding recipe (parts by mass) shown in Table 5 by using epoxy resins EP5 to 9 of Examples 5 to 8 and Comparative Example 4 as an epoxy resin and KAYAHARD A-A (a polycondensation product of ethylaniline and formaldehyde made by Nippon Kayaku Co., Ltd.) as a curing agent. A resin molded product is prepared by a cast molding method using the resulting epoxy resin composition and cured at 120° C. for 2 hours and further at 150° C. for 6 hours to obtain a cured product.

Moreover, the curing properties are measured according to the following methods. The results are shown in Table 5.

(11) Glass Transition Temperature (TMA, Coefficient of Thermal Expansion)

It is measured according to JIS K 7244.

(12) Flexural Test (Flexural Strength, Flexural Modulus and Energy at Maximum Point)

It is measured according to JIS K 6911.

From the results of Table 5, when the compounding ratio using the epoxy resin obtained by mixing the bisphenol F-type epoxy resin and the phenol aralkyl-type epoxy resin is same, the cured product made of the epoxy resin composition according to the invention is said to be a cured product being excellent in the heat resistance, low in the coefficient of thermal expansion, large in the energy at maximum point in the flexural test, durable to deflection and excellent in the toughness as compared with the cured product made of the epoxy resin composition for comparison.

The invention claimed is:

1. A modified liquid epoxy resin, which is obtained by mixing a bisphenol and a biphenyl-type phenol aralkyl resin in a mixing ratio and reacting the resulting mixture with an epihalohydrin,
wherein the mixing ratio of the bisphenol (A) and the biphenyl-type phenol aralkyl resin (B) in a mass ratio expressed as A/B as converted to epoxy resin is between 4/6 and 8/2,

TABLE 5

|  |  | Example 9 | Example 10 | Example 11 | Example 12 | Comparative Example 6 |
|---|---|---|---|---|---|---|
|  | Kind of sample/A:B |  |  |  |  |  |
| Compounding composition | EP5/5:5 | 100 |  |  |  |  |
|  | EP6/6:4 |  | 95 |  |  |  |
|  | EP7/4:6 |  |  | 104 |  |  |
|  | EP8/5:5 |  |  |  | 103 |  |
|  | EP9/5:5 |  |  |  |  | 110 |
|  | KAYAHARD A-A | 32 | 32 | 32 | 32 | 32 |
| Cured resin properties | Glass transition temperature (TMA ° C.) | 117 | 119 | 116 | 114 | 111 |
|  | Coefficient of thermal expansion (α1 ppm) | 73 | 76 | 72 | 74 | 76 |
|  | Flexural strength (MPa at 80° C.) | 80 | 77 | 81 | 78 | 75 |
|  | Flexural modulus (GPa at 80° C.) | 2.3 | 2.2 | 2.4 | 2.3 | 2.2 |
|  | Energy at maximum point (kgf/mm at 80° C.) | 90 | 81 | 96 | 85 | 76 | wherein the bisphenol (A) is bisphenol F having a bifunctional form purity of not less than 95% by area as detected by a gel permeation chromatography at UV 254 nm, wherein the bisphenol F includes a compound represented by the following formula (1):

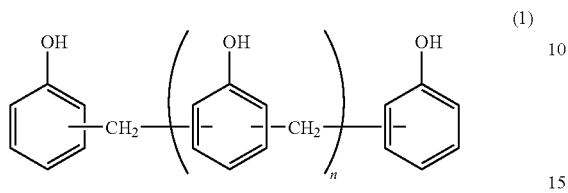

wherein n represents a repeating number and is an integer of not less than 1, and wherein the content of the compound of formula (1) is not more than 2% by area.

2. An epoxy resin composition comprising a modified liquid epoxy resin as claimed in claim 1 and a curing agent.

3. A cured product of an epoxy resin composition, which is formed by curing an epoxy resin composition as claimed in claim 2.

* * * * *